(12) United States Patent
Chen et al.

(10) Patent No.: US 11,434,889 B2
(45) Date of Patent: Sep. 6, 2022

(54) PISTON SEAL STRUCTURE FOR INJECTOR

(71) Applicants: BEIJING BEIFEN-RUILI ANALYTICAL INSTRUMENT (GROUP) CO., LTD., Beijing (CN); MAITUOWEI PRECISION INSTRUMENT MANUFACTURING HEBEI CO., LTD., Hebei (CN)

(72) Inventors: Lu Chen, Beijing (CN); Jiaxiang Deng, Hebei (CN); Rongbing Tian, Beijing (CN); Sainan Li, Beijing (CN); Jinrong Liu, Beijing (CN); Hongxiang Shu, Beijing (CN)

(73) Assignees: BEIJING BEIFEN-RUILI ANALYTICAL INSTRUMENT (GROUP) CO., LTD., Beijing (CN); MAITUOWEI PRECISION INSTRUMENT MANUFACTURING HEBEI CO., LTD., Langfang (CN)

( * ) Notice: Subject to any disclaimer, the term of this patent is extended or adjusted under 35 U.S.C. 154(b) by 298 days.

(21) Appl. No.: 16/910,405

(22) Filed: Jun. 24, 2020

(65) Prior Publication Data
US 2021/0025378 A1  Jan. 28, 2021

Related U.S. Application Data

(63) Continuation of application No. PCT/CN2020/097705, filed on Jun. 23, 2020.

(30) Foreign Application Priority Data

Jun. 25, 2019 (CN) .......................... 201910552834.6

(51) Int. Cl.
F04B 39/04 (2006.01)
F16J 15/00 (2006.01)
F16J 15/16 (2006.01)

(52) U.S. Cl.
CPC .......... *F04B 39/045* (2013.01); *F16J 15/002* (2013.01); *F16J 15/16* (2013.01)

(58) Field of Classification Search
CPC ..... F04B 39/045; F04B 53/143; F16J 15/002; F16J 15/16
See application file for complete search history.

(56) References Cited

U.S. PATENT DOCUMENTS

| 288,037 | A | * | 11/1883 | Donnenwerth | ....... F04B 39/045 |
| | | | | | 123/196 R |
| 2,768,843 | A | * | 10/1956 | Zeilman | ................. B66C 13/18 |
| | | | | | 285/190 |

(Continued)

FOREIGN PATENT DOCUMENTS

| CN | 2664687 Y | 12/2004 |
| CN | 105517606 A | 4/2016 |

(Continued)

*Primary Examiner* — Eugene G Byrd

(57) ABSTRACT

A piston-cylinder structure includes a cylinder, an end cap, a tapered portion for extruding dead space, an upper bowl-shaped seal portion, a columnar seal portion, a lower bowl-shaped seal portion and a piston push rod. The upper bowl-shaped seal portion is configured to form sealing between the piston push rod and the cylinder when the piston push rod moves toward the end cap and to remove crystals on an inner wall of the cylinder. The columnar seal portion is configured to enable the piston push rod to be coaxial with the cylinder, and to provide a mechanical support for the piston push rod. The lower bowl-shaped seal portion is configured to provide sealing between the piston push rod and the cylinder and remove the crystals on the inner wall of the cylinder when the piston push rod moves toward the end cap.

8 Claims, 3 Drawing Sheets

(56) References Cited

U.S. PATENT DOCUMENTS

| | | | | |
|---|---|---|---|---|
| 2,799,523 | A * | 7/1957 | Parker | B64D 37/005 277/584 |
| 2,918,336 | A * | 12/1959 | Slough | F04B 53/143 92/244 |
| 2,961,278 | A * | 11/1960 | Newhall | F16J 15/166 92/206 |
| 3,035,879 | A * | 5/1962 | Hanny | F04B 39/045 92/162 R |
| 3,131,611 | A * | 5/1964 | McLaughlin | F16J 15/166 92/252 |
| 3,443,485 | A * | 5/1969 | Van Dranen | F16J 15/164 92/194 |
| 3,491,654 | A * | 1/1970 | Zurcher | F16J 9/206 92/162 R |
| 3,647,325 | A * | 3/1972 | Johnson | F04B 9/1178 417/508 |
| 4,052,112 | A * | 10/1977 | Faber | F16J 15/32 277/944 |
| 4,177,837 | A * | 12/1979 | Frank | F16L 55/05 277/584 |
| 4,579,041 | A * | 4/1986 | Organ | F16K 15/148 91/437 |
| 4,602,791 | A * | 7/1986 | Zollner | F16J 15/56 277/584 |
| 4,627,795 | A * | 12/1986 | Schmitz-Montz | F04B 25/00 417/267 |
| 4,873,913 | A * | 10/1989 | Pruitt | F04B 39/045 92/158 |
| 4,889,039 | A * | 12/1989 | Miller | F16C 32/047 92/162 R |
| 5,052,278 | A * | 10/1991 | Smillie, III | F16J 15/56 92/158 |
| 5,403,170 | A * | 4/1995 | Bianchi | F04B 39/0005 92/187 |
| 5,615,896 | A * | 4/1997 | Morvant | F16J 15/3232 277/537 |
| 9,388,902 | B2 * | 7/2016 | Sueyoshi | F16J 15/166 |
| 9,435,336 | B2 * | 9/2016 | Rabhi | F16J 15/164 |
| 9,903,473 | B2 * | 2/2018 | Thuillier | F04D 7/08 |
| 2011/0277626 | A1 * | 11/2011 | Asai | F04B 39/0022 92/172 |
| 2020/0102946 | A1 * | 4/2020 | Chalk | F04B 39/128 |

FOREIGN PATENT DOCUMENTS

| | | | |
|---|---|---|---|
| CN | 106029136 A | 10/2016 | |
| CN | 206621647 U | 11/2017 | |
| CN | 108261587 A | 7/2018 | |
| CN | 108472455 A | 8/2018 | |
| DE | 202008002847 U1 * | 5/2009 | F16J 1/003 |

\* cited by examiner

PISTON SEAL STRUCTURE FOR INJECTOR

CROSS-REFERENCE TO RELATED APPLICATIONS

This application claims the benefit of priority from Chinese Patent Application No. 201910552834.6, filed on Jun. 25, 2019. The content of the aforementioned application, including any intervening amendments thereto, is incorporated herein by reference in its entirety.

TECHNICAL FIELD

The present application relates to piston seals, and more particularly to a piston-cylinder structure.

BACKGROUND

In the existing injectors or injection pumps, the suction and discharge of liquids are performed by means of the reciprocating movement of a piston or plunger, and the piston together with the injector cylinder forms a piston-cylinder structure.

In the prior art, elastic materials are often applied in the piston sealing, and the elastic materials mainly include high-elasticity materials such as O-ring, and low-elasticity materials, such as polymer materials (e.g. polytetrafluoroethylene).

In the piston sealing, the O-ring is generally arranged around the outside of the piston to form a tight seal with the injector cylinder, which has a low requirement for the dimensional accuracy of the piston. However, the O-ring is made of a rubber material with poor chemical stability and is in direct contact with the fluid inside the injector cylinder, so the O-ring is prone to denaturation or may contaminate the fluid. Therefore, there are extreme limitations in the application of the O-ring in the piston sealing.

Low-elasticity materials such as polytetrafluoroethylene (PTFE) and polyethylene are used to manufacture a piston, therefore a relatively high matching precision is required between the outer diameter of the sealing surface of the piston and the inner diameter of the cylinder; in other words, the difference between the outer diameter of the sealing surface and the inner diameter of the cylinder is generally 10-20 μm. The piston made of the low-elasticity material generally has good chemical stability, corrosion resistance, wear resistance, thermal stability and excellent sealing and lubricating properties, and thus the low-elasticity material is widely used in the manufacturing of injector components. However, since these polymer materials such as polytetrafluoroethylene and polyethylene often have a high linear thermal expansion coefficient (nearly $10\text{-}12\times10^{-5}/° C.$), the pistons made of such materials are sensitive to temperature change, and thus the injection pump including this piston is required to be operated at 15-40° C. In addition, the piston sealing involves a certain degree of elastic deformation, so the material used therein generally has low hardness and is prone to abrasion. For example, crystals will appear on the inner wall of the cylinder after the injector is used to suck and discharge a high salt or alkaline fluid, and it may scratch the piston sealing surface, resulting in a reduction in the sealing property and even liquid leakage.

As a special engineering plastic with excellent performances, polyether ether ketone (PEEK) resin is superior to other conventional engineering plastics in terms of high temperature (about 260° C.) resistance, mechanical performance, self-lubricating property, chemical corrosion resistance, peel resistance, abrasion resistance and radiation resistance, and it is well recognized as the optimal material in the engineering field. Besides, its linear thermal expansion coefficient (approximately $4.8\times10^{-5}/° C.$) is only about half of that of PTFE and other materials, so it is less sensitive to temperature change. In spite of the above excellent properties, the PEEK resin still fails to enable satisfactory sealing effect when directly used as the piston sealing material due to its large hardness and lack of elasticity.

SUMMARY

The object of this application is to provide a piston-cylinder structure to overcome the defects in the prior art. The piston structure is prepared from a composite of PEEK and PTFE, and is capable of significantly improve the existing injectors in the low temperature resistance and abrasion resistance.

The technical solutions of the invention are specifically described as follows.

This application provides a piston-cylinder structure, comprising:
 a cylinder;
 an end cap;
 a tapered portion for extruding dead space;
 an upper bowl-shaped seal portion;
 a columnar seal portion;
 a lower bowl-shaped seal portion; and
 a piston push rod;
 wherein the end cap is fixed on a top of the cylinder; a casing of the end cap is made of a corrosion-resistant metal material or a non-metallic material; a lining of the end cap is made of polytetrafluoroethylene (PTFE); the end cap has a funnel-shaped inner cavity to reduce dead volume of an inner cavity of the cylinder;

the piston push rod is made of PEEK; an upper portion of the piston push rod is cylindrical; an outer diameter of the upper portion of the piston push rod is smaller than a diameter of a bowl bottom of the upper bowl-shaped seal portion and the lower bowl-shaped seal portion; an outer diameter of a lower portion of the piston push rod is larger than that of the upper portion of the piston push rod, and is smaller than an inner diameter of the cylinder;

the upper portion of the piston push rod sequentially passes through the lower bowl-shaped seal portion, the columnar seal portion and the upper bowl-shaped seal portion, and is fixedly connected to the tapered portion; the piston push rod is configured to fix the lower bowl-shaped seal portion, the columnar seal portion, the upper bowl-shaped seal portion and the tapered portion, and drive the lower bowl-shaped seal portion, the columnar seal portion, the upper bowl-shaped seal portion and the tapered portion to reciprocate in the cylinder;

the tapered portion is made of PTFE or PEEK; an upper portion of the tapered portion fits the funnel-shaped inner cavity of the end cap in shape; a lower portion of the tapered portion fits the upper bowl-shaped seal portion in shape; the tapered portion is configured to expel a liquid in the cylinder when the upper portion of the tapered portion moves to the end cap so as to reduce the dead space in the inner cavity of the cylinder;

the upper bowl-shaped seal portion is provided below the tapered portion; the upper bowl-shaped seal portion is made of PEEK; a bowl opening of the upper bowl-shaped seal portion faces toward the tapered portion; the upper bowl-shaped seal portion is configured to form sealing between the piston push rod and the cylinder when the piston push rod moves toward the end cap and to remove crystals on an inner wall of the cylinder;

the columnar seal portion is provided below the upper bowl-shaped seal portion and above the lower bowl-shaped seal portion; the columnar seal portion is made of PTFE; a difference between an outer diameter of the columnar seal portion and the inner diameter of the cylinder is 10-20 μm; the columnar seal portion is configured to enable the piston push rod to be coaxial with the cylinder, and to provide a mechanical support for the piston push rod; the columnar seal portion provides an auxiliary sealing when the piston push rod reciprocates along the cylinder, and provides a mechanical support for the upper bowl-shaped seal portion and the lower bowl-shaped seal portion to prevent fluid leakage in the upper bowl-shaped seal portion and the lower bowl-shaped seal portion under overpressure;

the lower bowl-shaped seal portion is provided below the columnar seal portion; the lower bowl-shaped seal portion is made of PEEK; a bowl bottom of the lower bowl-shaped seal portion faces toward the columnar seal portion; and the lower bowl-shaped seal portion is configured to provide sealing between the piston push rod and the cylinder and remove the crystals on the inner wall of the cylinder when the piston push rod moves toward the end cap.

In an embodiment, the corrosion-resistant metal material comprises stainless steel; and the non-metallic material comprises PEEK.

In an embodiment, the piston push rod is fixed to the tapered portion by mechanical riveting.

In an embodiment, a thickness of a side wall of the upper bowl-shaped seal portion decreases from a bowl bottom to the bowl opening thereof; the side wall of the upper bowl-shaped seal portion at the bowl opening has a thickness of 0.3-1.0 mm; a difference between an outer diameter of the bowl opening of the upper bowl-shaped seal portion and the inner diameter of the cylinder is 10-20 μm; and the upper bowl-shaped seal portion fits the lower portion of the tapered portion.

In an embodiment, the piston push rod and the upper bowl-shaped seal portion are fixed by mechanical riveting.

In an embodiment, the piston push rod and the columnar seal portion are fixed by mechanical riveting.

In an embodiment, a thickness of a side wall of the lower bowl-shaped seal portion decreases from the bowl bottom to a bowl opening thereof; the side wall of the lower bowl-shaped seal portion at the bowl opening has a thickness of 0.3-1.0 mm; and a difference between an outer diameter of the bowl opening of the lower bowl-shaped seal portion and the inner diameter of the cylinder is 10-20 μm.

In an embodiment, the piston push rod and the lower bowl-shaped seal portion are fixed by mechanical riveting.

Compared to the prior art, the invention has the following beneficial effects.

In the piston-cylinder structure provided herein, the upper and lower bowl-shaped seal portions are both made of PEEK, which can improve the piston in the resistance to chemical corrosion, performance consistency, stability and abrasion resistance and expand the application temperature range of the injector. In particular, the piston-cylinder structure provided herein can effectively remove the crystals formed on the inner wall of the cylinder after the injection of a high-salt and alkaline solution, extending the service life and having a brilliant application prospect.

Figure 1:
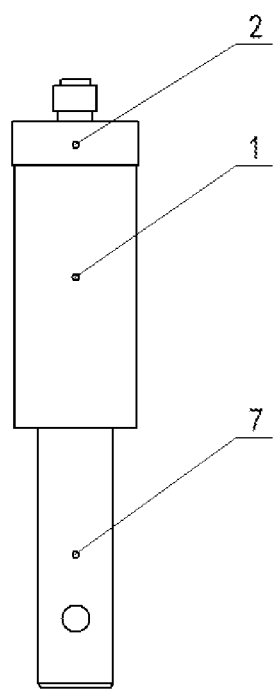
FIG. 1 is a front view of a piston-cylinder structure according to an embodiment of the present invention.

In the drawings, 1-cylinder; 2-end cap; 3-tapered portion; 4-upper bowl-shaped seal portion; 5-columnar seal portion; 6-lower bowl-shaped seal portion; and 7-piston push rod.

DETAILED DESCRIPTION OF EMBODIMENTS

The invention will be described in detail below with reference to the accompanying drawings and embodiments.

Figure 2:
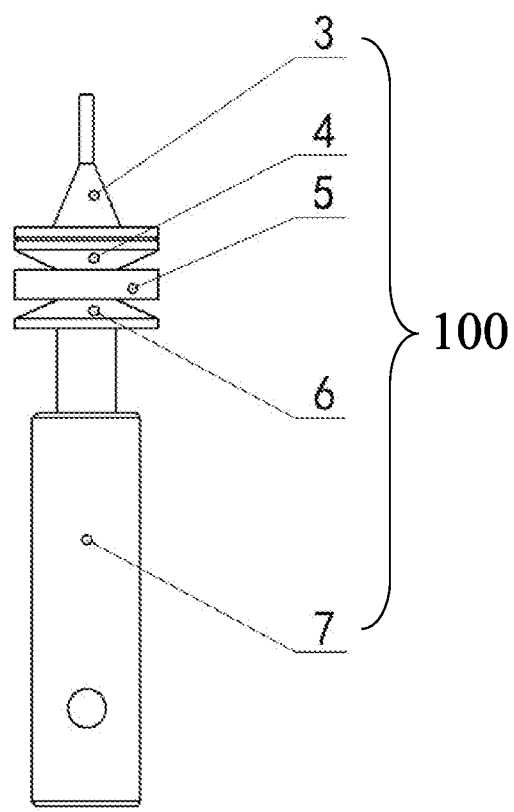
FIG. 2 is a front view of a piston push rod in the piston-cylinder structure according to an embodiment of the present invention.
Figure 3:
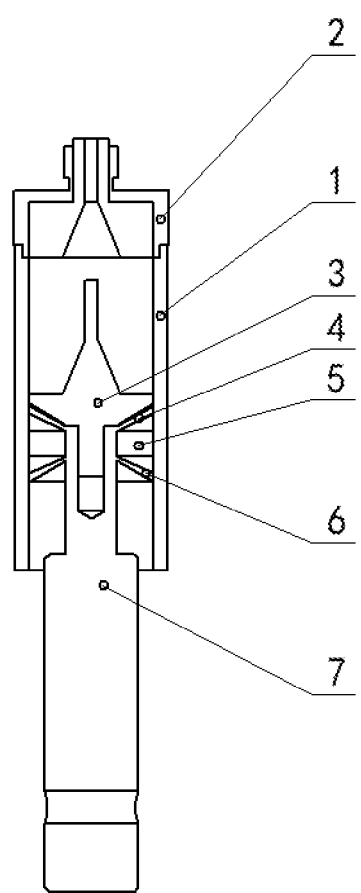
FIG. 3 is a sectional view of the piston-cylinder structure according to an embodiment of the present invention.

As shown in FIGS. 1-3, this application provides a piston-cylinder structure, including a cylinder 1, an end cap 2, a tapered portion 3 for extruding dead space; an upper bowl-shaped seal portion 4, a columnar seal portion 5, a lower bowl-shaped seal portion 6 and a piston push rod 7.

The end cap 2 is fixed on a top of the cylinder 1. A casing of the end cap 2 is made of a corrosion-resistant metal material or a non-metallic material. A lining of the end cap 2 is made of polytetrafluoroethylene (PTFE). The end cap 2 has a funnel-shaped inner cavity to reduce dead volume in an inner cavity of the cylinder 1.

The piston push rod 7 is made of PEEK. An upper portion of the piston push rod 7 is cylindrical. An outer diameter of the upper portion of the piston push rod 7 is smaller than a diameter of a bowl bottom of the upper bowl-shaped seal portion 4 and the lower bowl-shaped seal portion 6. An outer diameter of a lower portion of the piston push rod 7 is larger than that of the upper portion of the piston push rod 7, and is smaller than an inner diameter of the cylinder 1.

The upper portion of the piston push rod 7 sequentially passes through the lower bowl-shaped seal portion 6, the columnar seal portion 5 and the upper bowl-shaped seal portion 4, and is fixedly connected to the tapered portion 3. The piston push rod 7 is configured to fix the lower bowl-shaped seal portion 6, the columnar seal portion 5, the upper bowl-shaped seal portion 4 and the tapered portion 3, and drive the lower bowl-shaped seal portion 6, the columnar seal portion 5, the upper bowl-shaped seal portion 4 and the tapered portion 3 to reciprocate in the cylinder 1.

The tapered portion 3 is made of PTFE or PEEK. An upper portion of the tapered portion 3 fits the funnel-shaped inner cavity of the end cap 2 in shape. A lower portion of the tapered portion 3 fits the upper bowl-shaped seal portion 4 in shape. The tapered portion 3 is configured to expel liquid in the cylinder 1 when the upper portion of the tapered portion 3 moves to the end cap 2 so as to reduce the dead space in the inner cavity of the cylinder 1.

The upper bowl-shaped seal portion 4 is provided below the tapered portion 3. The upper bowl-shaped seal portion 4 is made of PEEK. A bowl opening of the upper bowl-shaped seal portion 4 faces toward the tapered portion 3. The upper bowl-shaped seal portion 4 is configured to form sealing between the piston push rod 7 and the cylinder 1 when the piston push rod 7 moves toward the end cap 2, and to remove crystals on an inner wall of the cylinder 1.

The columnar seal portion 5 is provided below the upper bowl-shaped seal portion 4 and above the lower bowl-shaped seal portion 6. The columnar seal portion 5 is made of PTFE. A difference between an outer diameter of the columnar seal portion 5 and the inner diameter of the cylinder 1 is 10-20 μm.

The columnar seal portion 5 is configured to enable the piston push rod 7 to be coaxial with the cylinder 1, and to provide a mechanical support for the piston push rod 7. The columnar seal portion 5 provides an auxiliary sealing when the piston push rod 7 reciprocates along the cylinder 1, and provides a mechanical support for the upper bowl-shaped seal portion 4 and the lower bowl-shaped seal portion 6 to prevent fluid leakage in the upper bowl-shaped seal portion 4 and the lower bowl-shaped seal portion 6 under overpressure.

The lower bowl-shaped seal portion 6 is provided below the columnar seal portion 5. The lower bowl-shaped seal portion 6 is made of PEEK. The bowl bottom of the lower bowl-shaped seal portion 6 faces toward the columnar seal portion 5. The lower bowl-shaped seal portion 6 is configured to provide sealing between the piston push rod 7 and the cylinder 1 and remove the crystals on the inner wall of the cylinder 1 when the piston push rod 7 moves toward the end cap 2.

The casing of the end cap 2 is made of PEEK or stainless steel.

The piston push rod is fixed to the tapered portion by mechanical riveting.

A thickness of a side wall of the upper bowl-shaped seal portion 4 decreases from a bowl bottom to the bowl opening thereof. The side wall of the upper bowl-shaped seal portion 4 at the bowl opening has a thickness of 0.3-1.0 mm. A difference between an outer diameter of the bowl opening of the upper bowl-shaped seal portion 4 and the inner diameter of the cylinder 1 is 10-20 μm. The upper bowl-shaped seal portion 4 fits the lower portion of the tapered portion 3.

The piston push rod 7 and the upper bowl-shaped seal portion 4 are fixed by mechanical riveting.

The piston push rod 7 and the columnar seal portion 5 are fixed by mechanical riveting.

A thickness of a side wall of the lower bowl-shaped seal portion 6 decreases from the bowl bottom to a bowl opening thereof. The side wall of the upper bowl-shaped seal portion 4 at the bowl opening has a thickness of 0.3-1.0 mm. A difference between an outer diameter of the bowl opening of the lower bowl-shaped seal portion 6 and the inner diameter of the cylinder 1 is 10-20 μm.

The piston push rod and the lower bowl-shaped seal portion are fixed by mechanical riveting.

In this embodiment, the tapered portion 3, the upper bowl-shaped seal portion 4, the columnar seal portion 5, the lower bowl-shaped seal portion 6 and the piston push rod 7 together constitutes a piston structure 100. The piston push rod 7 sequentially passes through the lower bowl-shaped seal portion 6, the columnar seal portion 5 and the upper bowl-shaped seal portion 4, and is riveted to the tapered portion 3. The piston push rod 7 is connected with the lower bowl-shaped seal portion 6, the columnar seal portion 5 and the upper bowl-shaped seal portion 4 by riveting, respectively. When the piston structure 100 moves toward the end cap 2, a high pressure will be formed in the closed cavity between the upper bowl-shaped seal portion 4 and the end cap 2, and its pressure increases as the flow resistance of the outlet of the end cap 2 increases. Moreover, the high pressure in the closed cavity between the upper bowl-shaped seal portion 4 and the end cap 2 will press the upper bowl-shaped seal portion 4 to generate a mechanical deformation that is circumferentially uniform. Due to the mechanical deformation, the bowl opening structure of the upper bowl-shaped seal portion 4 will closely fit the inner wall of the cylinder 1. Within a certain pressure range, a higher pressure in the sealed cavity between the upper bowl-shaped seal portion 4 and the end cap 2 will result in an increase in the amount of the circumferential mechanical deformation occurring to the upper bowl-shaped seal portion 4, and also cause the bowl opening structure of the upper bowl-shaped seal portion 4 to fit the inner wall of the cylinder 1 more closely, enabling a piston sliding seal during the injection. In addition, since the PEEK has a hardness similar to nickel steel, the upper bowl-shaped seal portion 4 made of the PEEK can effectively resist the scratching of the crystals without deformation, enabling the removal of the crystals on the inner wall of the cylinder 1. When the piston structure 100 moves toward the opening of the cylinder 1, a vacuum pressure will be formed in the closed cavity between the lower bowl-shaped seal portion 6 and the end cap 2, and its pressure decrease as the flow resistance increases at the inlet of the end cap 2. After the low pressure is formed, the atmospheric pressure will press the lower bowl-shaped seal portion 6 to generate uniform circumferential mechanical deformation, and thus the bowl opening structure of the lower bowl-shaped seal portion 6 forms a close fit with the inner wall of the cylinder 1. Within a certain pressure range, a lower pressure in the sealed cavity between the lower bowl-shaped seal portion 6 and the end cap 2 will result in an increase in the amount of the circumferential mechanical deformation occurring to the lower bowl-shaped seal portion 6, and also cause the bowl opening structure of the lower bowl-shaped seal portion 6 to fit the inner wall of the cylinder 1 more closely, enabling a piston sliding seal during the suction. In addition, since the PEEK has a hardness similar to nickel steel, the lower bowl-shaped seal portion 6 made of the PEEK can effectively resist the scratching of the crystals without deformation, enabling the removal of the crystals on the inner wall of the cylinder 1. When the piston structure 100 moves up and down, the columnar seal portion 5 forms a close fit with the cylinder 1, and its relatively large sealing contact surface can ensure the piston structure 100 to be highly coaxial with the cylinder 1, thus ensuring sufficiently high coaxiality between the upper bowl-shaped seal portion 4 and the cylinder 1 and between the lower bowl-shaped seal portion 6 and the cylinder 1. The columnar seal portion 5 can also provide a support for the upper bowl-shaped seal portion 4 and the lower bowl-shaped seal portion 6, preventing fluid leakage in the upper bowl-shaped seal portion 4 and the lower bowl-shaped seal portion 6 under overpressure. Moreover, the columnar seal portion 5 is made of PTFE, and it adopts a traditional piston seal structure, so it has a sealing effect comparable to the traditional piston, effectively providing auxiliary sealing in the piston-cylinder structure provided herein. The upper bowl-shaped seal portion 4 and the lower bowl-shaped seal portion 6 can effectively remove the crystals on the inner wall of the cylinder 1 to protect the columnar seal portion 5 which is made of softer PTFE from being scratched by the crystals, extending the service life of the columnar seal portion 5.

Described above are merely preferred embodiments of the invention, which are not intended to limit the invention. It should be noted that any modification, change and replacement made by those skilled in the art without departing from the spirit of the invention should fall within the scope of the invention.

What is claimed is:
1. A piston-cylinder structure, comprising:
a cylinder;
an end cap;
a tapered portion for extruding dead space;
an upper bowl-shaped seal portion;
a columnar seal portion;
a lower bowl-shaped seal portion; and
a piston push rod;

wherein the end cap is fixed on a top of the cylinder; a casing of the end cap is made of a corrosion-resistant metal material or a non-metallic material; a lining of the end cap is made of polytetrafluoroethylene (PTFE); the end cap has a funnel-shaped inner cavity to reduce dead volume of an inner cavity of the cylinder;

the piston push rod is made of PEEK; an upper portion of the piston push rod is cylindrical; an outer diameter of the upper portion of the piston push rod is smaller than a diameter of a bowl bottom of the upper bowl-shaped seal portion and a diameter of a bowl bottom of the lower bowl-shaped seal portion; an outer diameter of a lower portion of the piston push rod is larger than that of the upper portion of the piston push rod, and is smaller than an inner diameter of the cylinder;

the upper portion of the piston push rod sequentially passes through the lower bowl-shaped seal portion, the columnar seal portion and the upper bowl-shaped seal portion, and is fixedly connected to the tapered portion; the piston push rod is configured to fix the lower bowl-shaped seal portion, the columnar seal portion, the upper bowl-shaped seal portion and the tapered portion, and drive the lower bowl-shaped seal portion, the columnar seal portion, the upper bowl-shaped seal portion and the tapered portion to reciprocate in the cylinder;

the tapered portion is made of PTFE or PEEK; an upper portion of the tapered portion fits the funnel-shaped inner cavity of the end cap in shape; a lower portion of the tapered portion fits the upper bowl-shaped seal portion in shape; the tapered portion is configured to expel liquid in the cylinder when the upper portion of the tapered portion moves to the end cap so as to reduce the dead space in the inner cavity of the cylinder;

the upper bowl-shaped seal portion is provided below the tapered portion; the upper bowl-shaped seal portion is made of PEEK; a bowl opening of the upper bowl-shaped seal portion faces toward the tapered portion; the upper bowl-shaped seal portion is configured to form an effective seal between the piston push rod and the cylinder when the piston push rod moves toward the end cap and to remove crystals on an inner wall of the cylinder;

the columnar seal portion is provided below the upper bowl-shaped seal portion and above the lower bowl-shaped seal portion; the columnar seal portion is made of PTFE; a difference between an outer diameter of the columnar seal portion and the inner diameter of the cylinder is 10-20 µm;

the columnar seal portion is configured to enable the piston push rod to be coaxial with the cylinder, and to provide a mechanical support for the piston push rod; the columnar seal portion provides an auxiliary sealing when the piston push rod reciprocates along the cylinder, and provides a mechanical support for the upper bowl-shaped seal portion and the lower bowl-shaped seal portion to prevent fluid leakage in the upper bowl-shaped seal portion and the lower bowl-shaped seal portion under overpressure;

the lower bowl-shaped seal portion is provided below the columnar seal portion; the lower bowl-shaped seal portion is made of PEEK; a bowl bottom of the lower bowl-shaped seal portion faces toward the columnar seal portion; and the lower bowl-shaped seal portion is configured to provide sealing between the piston push rod and the cylinder and remove the crystals on the inner wall of the cylinder when the piston push rod moves toward the end cap.

2. The piston-cylinder structure of claim 1, wherein the corrosion-resistant metal material comprises stainless steel; and the non-metallic material comprises PEEK.

3. The piston-cylinder structure of claim 1, wherein the piston push rod is fixed to the tapered portion by mechanical riveting.

4. The piston-cylinder structure of claim 1, wherein a thickness of a side wall of the upper bowl-shaped seal portion decreases from the bowl bottom to the bowl opening thereof; the side wall of the upper bowl-shaped seal portion at the bowl opening has a thickness of 0.3-1.0 mm; a difference between an outer diameter of the bowl opening of the upper bowl-shaped seal portion and the inner diameter of the cylinder is 10-20 µm; and the upper bowl-shaped seal portion fits the lower portion of the tapered portion.

5. The piston-cylinder structure of claim 1, wherein the piston push rod and the upper bowl-shaped seal portion are fixed by mechanical riveting.

6. The piston-cylinder structure of claim 1, wherein the piston push rod and the columnar seal portion are fixed by mechanical riveting.

7. The piston-cylinder structure of claim 1, wherein a thickness of a side wall of the lower bowl-shaped seal portion decreases from the bowl bottom to a bowl opening thereof; the side wall of the lower bowl-shaped seal portion at the bowl opening has a thickness of 0.3-1.0 mm; and a difference between an outer diameter of the bowl opening of the lower bowl-shaped seal portion and the inner diameter of the cylinder is 10-20 µm.

8. The piston-cylinder structure of claim 1, wherein the piston push rod and the lower bowl-shaped seal portion are fixed by mechanical riveting.

* * * * *